(12) United States Patent
Mohajer et al.

(10) Patent No.: US 10,102,201 B2
(45) Date of Patent: Oct. 16, 2018

(54) NATURAL LANGUAGE MODULE STORE

(71) Applicant: SoundHound Inc., Santa Clara, CA (US)

(72) Inventors: Keyvan Mohajer, Los Gatos, CA (US); Kamyar Mohajer, San Jose, CA (US); Bernard Mont-Reynaud, Sunnyvale, CA (US); Pranav Singh, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 14/954,810

(22) Filed: Nov. 30, 2015

(65) Prior Publication Data

US 2017/0154628 A1  Jun. 1, 2017

(51) Int. Cl.
*G06F 17/27* (2006.01)
*G06F 17/28* (2006.01)
*G10L 15/30* (2013.01)
*G06Q 30/02* (2012.01)
*G06Q 20/10* (2012.01)

(52) U.S. Cl.
CPC .......... *G06F 17/28* (2013.01); *G06Q 20/102* (2013.01); *G06Q 30/0283* (2013.01); *G10L 15/30* (2013.01)

(58) Field of Classification Search
CPC ......... G10L 15/18; G10L 15/22; G06F 21/10; G06F 21/105
USPC .................. 704/257, 270, 275, 9; 705/59
See application file for complete search history.

(56) References Cited

U.S. PATENT DOCUMENTS

| | | | | | |
|---|---|---|---|---|---|
| 5,224,040 | A * | 6/1993 | Tou | ...................... | G06F 17/2863 704/2 |
| 7,502,738 | B2 * | 3/2009 | Kennewick | ............. | G10L 15/22 704/257 |
| 7,689,442 | B2 * | 3/2010 | Childress | ............... | G06Q 10/10 704/2 |
| 8,484,031 | B1 * | 7/2013 | Yeracaris | ................ | G10L 15/30 704/270.1 |
| 2002/0026319 | A1 * | 2/2002 | Niie | ........................ | G10L 15/32 704/270 |
| 2002/0128842 | A1 * | 9/2002 | Hoi | ......................... | G06Q 30/02 704/260 |
| 2003/0004717 | A1 * | 1/2003 | Strom | ................... | G10L 15/197 704/240 |
| 2003/0229497 | A1 * | 12/2003 | Wilson | ...................... | G09B 5/04 704/270.1 |

(Continued)

*Primary Examiner* — Shaun Roberts
(74) *Attorney, Agent, or Firm* — Stevens Law Group

(57) ABSTRACT

The present invention extends to methods, systems, and computer program products for a natural language module store. In general, the invention can be used to manage natural language modules offered through a natural language module store. Natural language module (NLM) developers can post NLMs at a NLM store to make the NLMs available for use by others. Developers can select NLMs for inclusion in natural language interpreters (NLIs) containing (and possibly integrating the functionality of) one or more NLMs. Prior to selecting a NLM, a developer can search or browse NLMs to identify an appropriate NLM. Optionally, a developer can test a NLM in the NLM store prior to inclusion in an NLI. For example, multiple NLMs purporting to provide the same specified natural language functionality can be tested relative to one another prior to selection of one of the NLMs for inclusion in an NLI.

24 Claims, 18 Drawing Sheets

(56) References Cited

U.S. PATENT DOCUMENTS

| | | | |
|---|---|---|---|
| 2004/0172248 A1* | 9/2004 | Otsuka | G06F 3/16 704/254 |
| 2004/0192384 A1* | 9/2004 | Anastasakos | G10L 15/30 455/557 |
| 2005/0038752 A1* | 2/2005 | Gaetano, Jr. | G06Q 20/00 705/59 |
| 2005/0289072 A1* | 12/2005 | Sabharwal | G06F 21/10 705/59 |
| 2006/0059561 A1* | 3/2006 | Ronning | G06F 21/10 726/26 |
| 2006/0271352 A1* | 11/2006 | Nikitin | G06F 17/289 704/9 |
| 2008/0065551 A1* | 3/2008 | Niakan | G06F 21/105 705/59 |
| 2008/0228513 A1* | 9/2008 | McMillan | G06F 21/105 705/1.1 |
| 2008/0249760 A1* | 10/2008 | Marcu | G06F 17/289 704/2 |
| 2008/0249775 A1* | 10/2008 | Chiu | G10L 15/22 704/257 |
| 2008/0276321 A1* | 11/2008 | Svancarek | G06F 21/10 726/26 |
| 2009/0119091 A1* | 5/2009 | Sarig | G06F 17/2836 704/2 |
| 2010/0161335 A1* | 6/2010 | Whynot | G10L 15/22 704/254 |
| 2011/0161077 A1* | 6/2011 | Bielby | G10L 15/32 704/231 |
| 2011/0243310 A1* | 10/2011 | Franklin-Barr | H04M 1/64 379/88.01 |
| 2012/0053936 A1* | 3/2012 | Marvit | G10L 15/26 704/235 |
| 2012/0166300 A1* | 6/2012 | Marsano | G06F 21/105 705/26.1 |
| 2012/0215543 A1* | 8/2012 | Oz | G06F 3/167 704/275 |
| 2012/0240039 A1* | 9/2012 | Walker | G06F 17/2836 715/265 |
| 2013/0018650 A1* | 1/2013 | Moore | G06F 17/2818 704/9 |
| 2014/0025380 A1* | 1/2014 | Koch | G10L 15/1822 704/257 |
| 2014/0032220 A1* | 1/2014 | Lerner | G10L 17/24 704/273 |
| 2014/0136507 A1* | 5/2014 | Cox | G06F 17/30657 707/706 |

\* cited by examiner

Figure 12A:
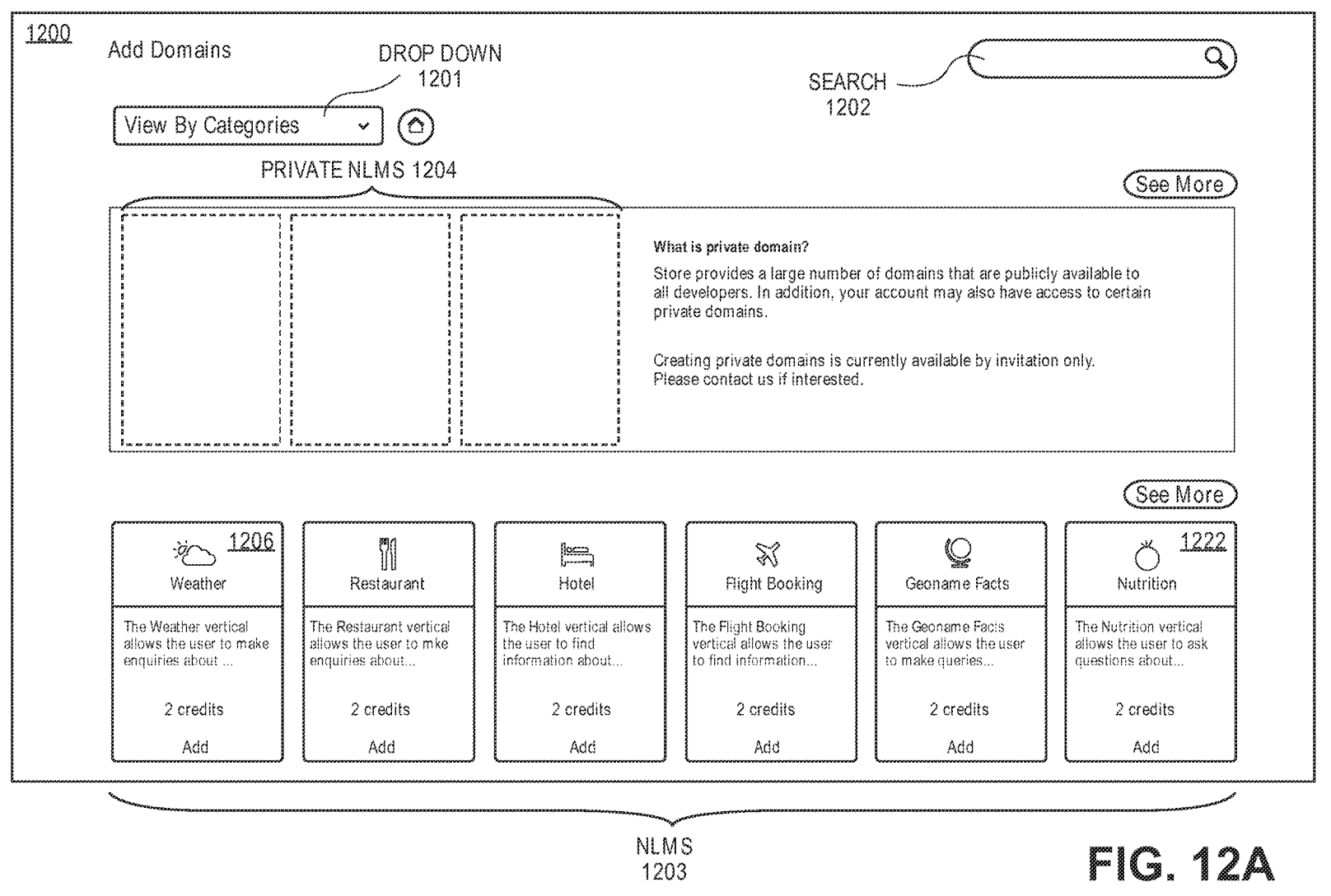

Add Domains

DROP DOWN 1201

SEARCH 1202

View By Categories

PRIVATE NLMS 1204

See More

What is private domain?

Store provides a large number of domains that are publicly available to all developers. In addition, your account may also have access to certain private domains.

Creating private domains is currently available by invitation only. Please contact us if interested.

See More

NLMS 1203

1206 — Weather
The Weather vertical allows the user to make enquiries about...
2 credits
Add Restaurant
The Restaurant vertical allows the user to mke enquiries about...
2 credits
Add Hotel
The Hotel vertical allows the user to find information about...
2 credits
Add Flight Booking
The Flight Booking vertical allows the user to find information...
2 credits
Add Geoname Facts
The Geoname Facts vertical allows the user to make queries.
2 credits
Add 1222 — Nutrition
The Nutrition vertical allows the user to ask questions about...
2 credits
Add

SELECTED NLMS
1231

1232
1206

Add Domains

1201

View All

Restaurant

🍽 Weather
1206

The Weather vertical allows the user to make enquiries about past, present, and future weather conditions in various locations and get back the requested information.

☐ Preferred    ⚙ Yes    (H) 2 credit 2 credits    Remove

Hotel

The Weather vertical allows the user to make enquiries about past, present, and future weather conditions in various locations and get back the requested information.

☐ Preferred    ⚙ Yes    (H) 2 credit

Add

✈ Flight Booking
1232

2 credits    Add

Remove

NLMs
1203

NATURAL LANGUAGE MODULE STORE

CROSS-REFERENCE TO RELATED APPLICATIONS

Not applicable.

BACKGROUND

1. Field of the Invention

This invention relates generally to online stores, and, more particularly, to managing natural language modules offered through a natural language module store.

2. Related Art

When developing software applications, a software developer typically relies on code developed by others. Specifically, in the field of natural language processing, software applications use particular programming code to interpret and respond to complex linguistic inputs, such as user queries or other expressions in a natural language (whether specified as text or as speech). Implementing such interpretation code in a usable, accurate, and efficient manner is typically highly complex and requires a sophisticated understanding of Natural Language Processing (NLP) and learning the specifics of a development environment—things that are often beyond the skills of a typical application developer. For example, a developer of a natural language interface to a shopping application, a music player, or a calendaring application may not have any prior knowledge or experience in developing natural language processing code.

Hence, instead of developing interpretation code themselves, application software developers can utilize existing natural language interpretation code created by other developers skilled in the area of natural language interpretation. As such, a software developer can access a repository of natural language interpretation code. The software developer can search the repository to identify appropriate natural language interpretation code for inclusion in an application. When added to an application, the application software developers can then access the output of parsing and interpreting queries by the natural language interpretation code.

During execution, an interpretation engine can use the natural language interpretation code to parse natural language input to the application. For example, the interpretation engine can use the natural language interpretation code to perform a specified interpretation task, such as to interpret a user's natural language expression of a desired period of time (e.g., "schedule a meeting for next Saturday afternoon"), of desired products to locate (e.g., "I want a black jacket, size 5"), or the like.

To identify relevant natural language interpretation code, a developer can search and examine the code repository for an existing code block that is designed to interpret expressions of the desired type. The developer can enter search terms using either text or speech to facilitate a search. The developer can select identified natural language interpretation code from among search results for inclusion in an application.

A developer of natural language interpretation code may desire compensation for use of their natural language interpretation code. However, there is typically no standard mechanism to indicate a compensation structure for natural language interpretation code. Thus, it may be difficult to relay compensation terms to a software developer and/or to efficiently implement financial transactions to facilitate payment in accordance with compensation terms. Further, a software developer may have limited, if any, mechanisms to determine cost for using of natural language interpretation code or how to pay for use of the natural language interpretation code.

BRIEF DESCRIPTION OF THE DRAWINGS

The specific features, aspects and advantages of the present invention will become better understood with regard to the following description and accompanying drawings where:

FIGS. 12A-12D illustrate various user interface screens associated with adding natural language modules to a natural language interpreter.

DETAILED DESCRIPTION

Figure 1:
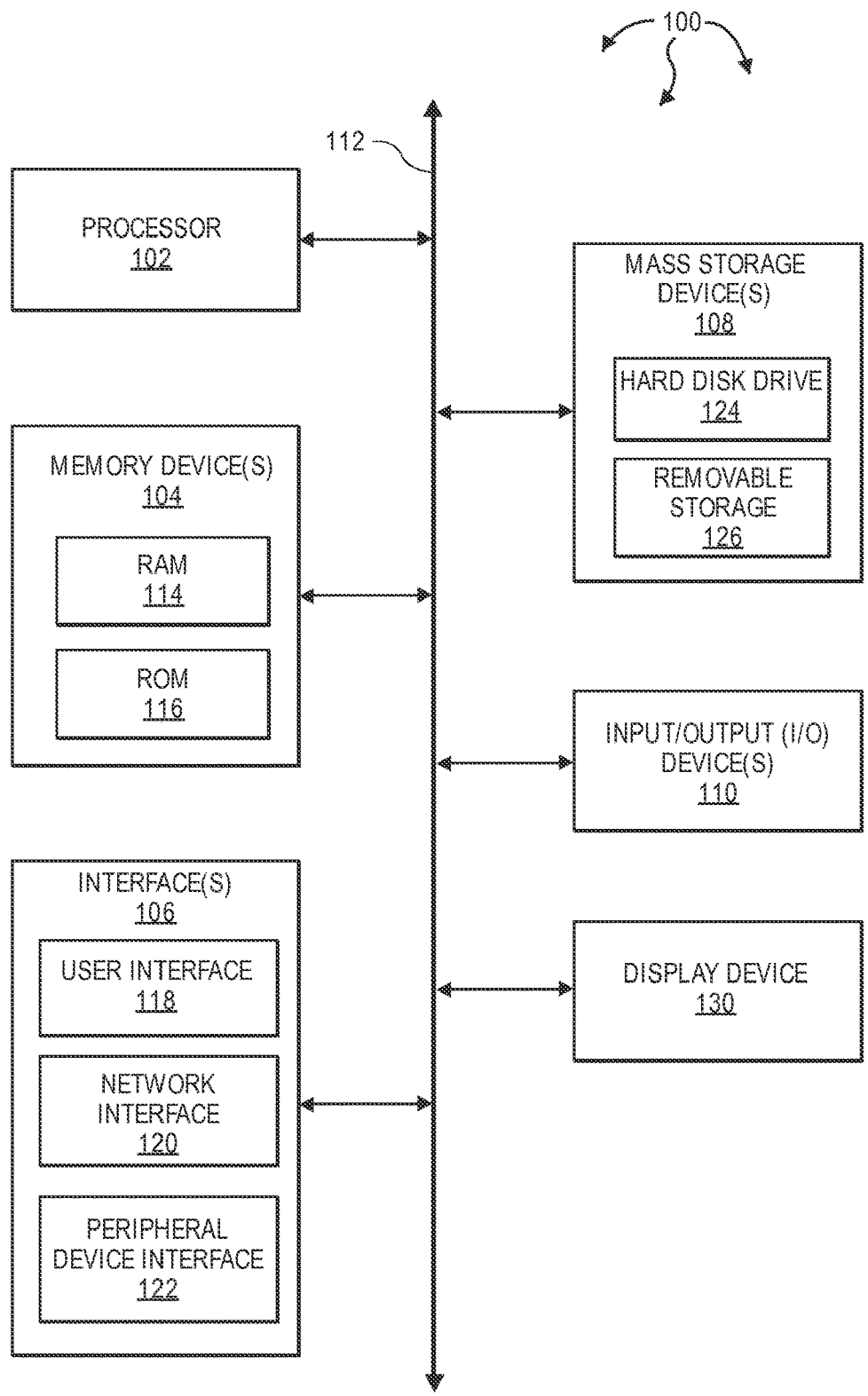
FIG. 1 illustrates an example block diagram of a computing device.

The present invention extends to methods, systems, and computer program products for a natural language module store. In one aspect, natural language module (NLM) developers can list natural language modules (NLMs) at a natural language module (NLM) store to make the NLMs available for use by others. A NLM developer submits a NLM to a NLM store. The NLM store receives the NLM from the developer. The NLM developer submits a pricing model to the NLM store. The pricing model is for use in tracking charges for using the NLM. The NLM store receives the pricing model from the NLM developer. The NLM developer sends instructions to the NLM store to associate the pricing model with the NLM. The NLM store receives the instructions from the NLM developer. The NLM store associates the pricing model with the NLM so that the pricing model can be used to track charges for using the NLM when the NLM is included in a natural language interpreter. The NLM store can offer the NLM as available for inclusion in natural language interpreters.

Other developers can add NLMs offered at a NLM store to natural language interpreters (e.g., applications, natural language packages, etc.). A developer can select one or more NLMs from a NLM store for inclusion in a natural language interpreter. Each natural language module is associated with a pricing model for determining charges associated with usage of the NLM by the natural language interpreter. The NLM store receives the selection of the one or more NLMs. The developer sends instructions to the NLM store to add the one or more natural language modules to the natural language interpreter. The NLM store adds the one or more natural language modules to the natural language interpreter.

The developer sends an instruction to register the natural language interpreter with an owner of the NLM store so that charges associated with the one or more NLMs can be assessed for the owner of the natural language interpreter. The owner of the NLM store registers the natural language interpreter so that the corresponding pricing models can be used to assess charges against appropriate entities.

In an additional aspect, the natural language interpreter is a natural language package containing (and possibly integrating the functionality of) one or more NLMs. The natural language package is offered by the NLM store for inclusion in other natural language interpreters or in an application. The natural language package can have an additional pricing model for determining charges associated with the natural language package. As such, corresponding pricing models for the one or more NLMs and the additional pricing model for the natural language interpreter can be used to assess charges against appropriate entities. For example, owners (which may or may not developers) for the one or more NLMs can assess charges against the developer of the natural language package and the developer of the natural language package can assess charges against a developer that includes the natural language package in an application.

In another aspect, prior to selecting a NLM, a developer can search or browse NLMs to identify an appropriate NLM. A developer can input a natural language query (e.g., a spoken command) to the NLM store. The NLM store receives the natural language query and identifies one or more NLMs capable of interpreting at least part of the natural language query. The NLM store returns a list of the one or more NLMs to the developer. The developer receives the list from the NLM store. The developer selects a natural language module from among the one or more natural language modules (e.g., for inclusion in a natural language interpreter).

In a further aspect, a NLM is tested prior to inclusion in a natural language interpreter. A NLM is selected for possible inclusion in a natural language interpreter. The NLM is purported to provide specified natural language functionality. The NLM is tested by, for each of one or more test cases, evaluating the ability of the natural language module to interpret a natural language query input associated with the test case. For each test case, the natural language query is input to the natural language module. The NLM processes the natural language query to generate results. The results are received back from the NLM. The ability of the natural language module to provide the specified natural language functionality is evaluated based on the accuracy of the results.

In a further additional aspect, multiple NLMs purporting to provide the same specified natural language functionality are tested relative to one another prior to selection of one of the NLMs for inclusion in a natural language interpreter. A plurality of NLMs is selected. Each of the plurality of NLMs is configured to provide specified natural language functionality. For the plurality of NLMS, each of the plurality of NLMs is tested relative to one another. Testing includes, for each NLM, exercising one or more test cases. Exercising a test case includes evaluating the ability of the NLM to interpret a natural language query input to the NLM. The accuracy of results from interpreting the natural language query is verified.

During execution of a natural language interpreter, pricing models can be used to determine charges for using NLMs. A natural language query is received for a natural language interpreter (e.g., a natural language package, application, etc.). A natural language processor uses one or more NLMs to interpret the natural language query for the natural language interpreter. For each of the one or more NLMs, a charge is calculated for processing the natural language query. The charge is determined in accordance with a pricing model defined for the NLM. A payment for a portion of the calculated charge can be transferred from an owner of the natural language interpreter to a developer of the NLM. A payment for another portion of the calculated charge can be transferred from an owner of the natural language interpreter to an owner of the natural language processor.

When a natural language interpreter is included within another natural language interpreter, such as, for example, when a natural language package (including one or more NLMs) is included in an application, the natural language interpreter can also have an additional pricing model. As such, an additional charge can also be determined in accordance with the additional pricing model. A payment for the additional calculated charge can be transferred from an owner of the application to a developer of the natural language package.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans.

Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and in the following claims, a "natural language processing" (NLP) system is defined as a system that receives a natural language query (e.g., a text query or speech query) and returns a response based on an interpreted meaning of the query. In one aspect, an application transmits a natural language query, along with some context information, to an NLP system. The context information defines a context for the natural language query. The NLP system parses and interprets the query in the defined context. The NLP system can choose and return an appropriate (e.g., best, highest scoring, etc.) interpretation from among available interpretations. Internally, within an NLP system, the meaning of a natural language query is represented in data structure (a "meaning representation" or (MR)) that encodes semantics of the query. A response from an NLP system is derived from the query's meaning.

A query can be interpreted as a request for action (e.g., "Call John Stuart") and/or a request for information (e.g., "What is Mike Trout's batting average?). The internal MR for an action request query can take the form of a command data structure. The MR for a request for information query can also be a command data structure. For a request for information query, an NPL system can compute the answer internally or can create a command to delegate finding the answer (thereby "passing the buck") to a downline application.

In one aspect, an NLP system interprets a query as both a request for action and a request for data. For example, interpreting the query "what is two times five" may create a composite response. The composite response can indicate its "command type" (an arithmetic command). The composite response can also comprise one or more of: a short spoken response ("10"), a long written response ("the value of two times five is ten"), or a long written response ("2*5 is 10"). The composite response might also include a HyperText Markup Language (HTML) response including graphics and other data fields.

The composite of all these data fields is the output of the NLP system. Output format can depend on command type. Output data can be serialized according to a shared definition of the serial format. In one aspect, JavaScript Object Notation (JSON) is used for serializing output data.

An application that receives back a (e.g., serialized) response from an NLP system can decide how to handle the response. Spoken responses can be text intended to be spoken out by sending the text to a test-to-speech synthesizer. If the application has access to text-to-speech it may create a vocal response. Handing of an NLP system response can also be affected by user preferences. Written responses can be displayed by the application on a display, if one is available. When an HTML response is present, an application may choose to display the HTML instead of the text on an available display.

Some command types may invoke custom code that performs additional operations. For example, a "dialer" application may handle a command of type "phone_dial" by looking up a name in a user's contacts and dialing the number. Thus, the application handles the choice of how to act upon an NLP system's response. An application's choice can be guided by device capabilities (e.g., does a device have a display? does a device it have text-to-speech? Can a device display HTML?) as well as application developer's desires for the application.

In this description and in the following claims, a "natural language module" (NLM) is defined as a module that provides query interpretation functionality to an NLP system. An NLP system can include one or more NLMs. Each NLM is configured to process a specified subset of queries. For example, an NLP system can include a NLM for interpreting arithmetic equations, a NLM for interpreting requests to dial a telephone number, a NLM for interpreting request for stock quotes, etc. When an NLP system receives a query from an application, the NLP system selects an appropriate NLM to process the query; when there are competing interpretations, the system may choose the highest-ranking one, or in some cases, ask the user for a clarification. The selected NLM can interpret the query as a request for action and/or a request for data and create an appropriate (and possibly composite) response. The NLP system can return the NLM created response back to application.

In this description and in the following claims, a "private natural language module" or "private NLM" is defined as a limited access NLM. A private NLM is visible by and accessible to the owner of the private NLM, and may also be visible by or accessible to others, if they have proper access credentials. Visibility and/or access to a private NLM is controlled by the owner of the NLM and its agents. In one aspect, a NLM can be kept private for competitive reasons. For example, multiple different car manufacturers may create their own NLMs for controlling the functionality of their own automobiles, and they may not wish to share their proprietary NLMs with other car manufacturers. Thus, the car manufacturers are likely to make their NLMs private to restrict their access by others. In another aspect, a NLM owner may make a NLM private during development, such as, for example, for a private Beta release. When the NLM is fully operational, the owner can make it more generally available, and no longer be private.

In this description and in the following claims, a "natural language interpreter" (NLI) is defined as a collection of one or more NLMs. In some aspects, an NLI is based on a natural language package. A natural language package integrates a collection of one or more NLMs to act as another NLM (with the collective functionality of the one or more integrated NLMs). In other aspects, an NLI can be an application. The application can have additional behaviors, such as, for example, creating or displaying outputs or taking actions. Thus, NL modules can act as natural language front-ends for applications that also have a back-end, for example, displaying information, making a phone call, etc.

In general, aspects of the invention are used to managing natural language modules offered through a natural language module store.

Figure 2:
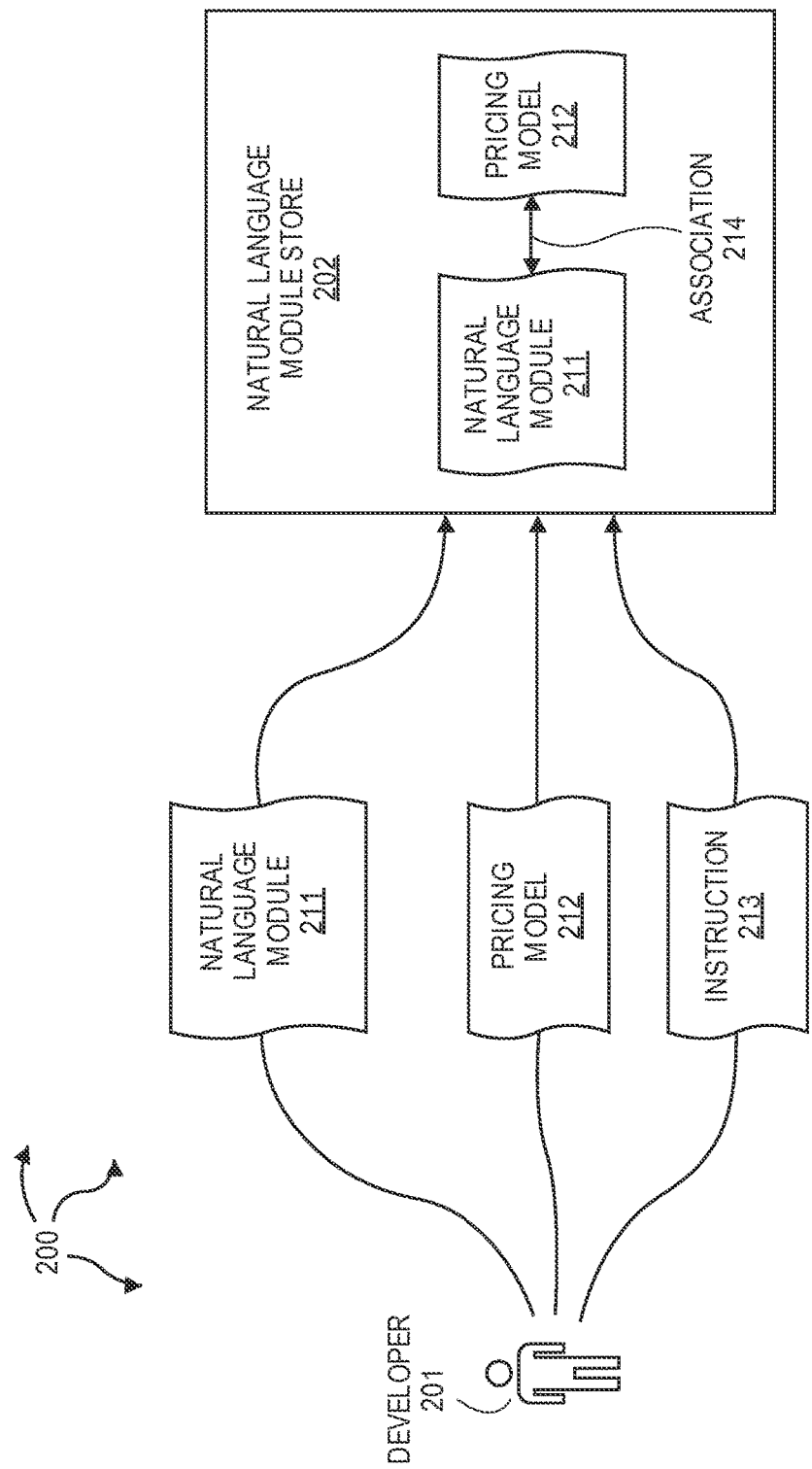
FIG. 2 illustrates an example computer architecture that facilitates making natural language recognition functionality available for inclusion in a natural language interpreter.

FIG. 2 illustrates an example computer architecture 200 that facilitates making natural language recognition functionality available for inclusion in a natural language interpreter. Referring to FIG. 2, computer architecture 200 includes natural language module store 202. Natural language module store 202 as well as its respective components can be connected to one another over (or be part of) a network, such as, for example, a PAN, a LAN, a WAN, and even the Internet. Accordingly, natural language module store 202 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Figure 3:
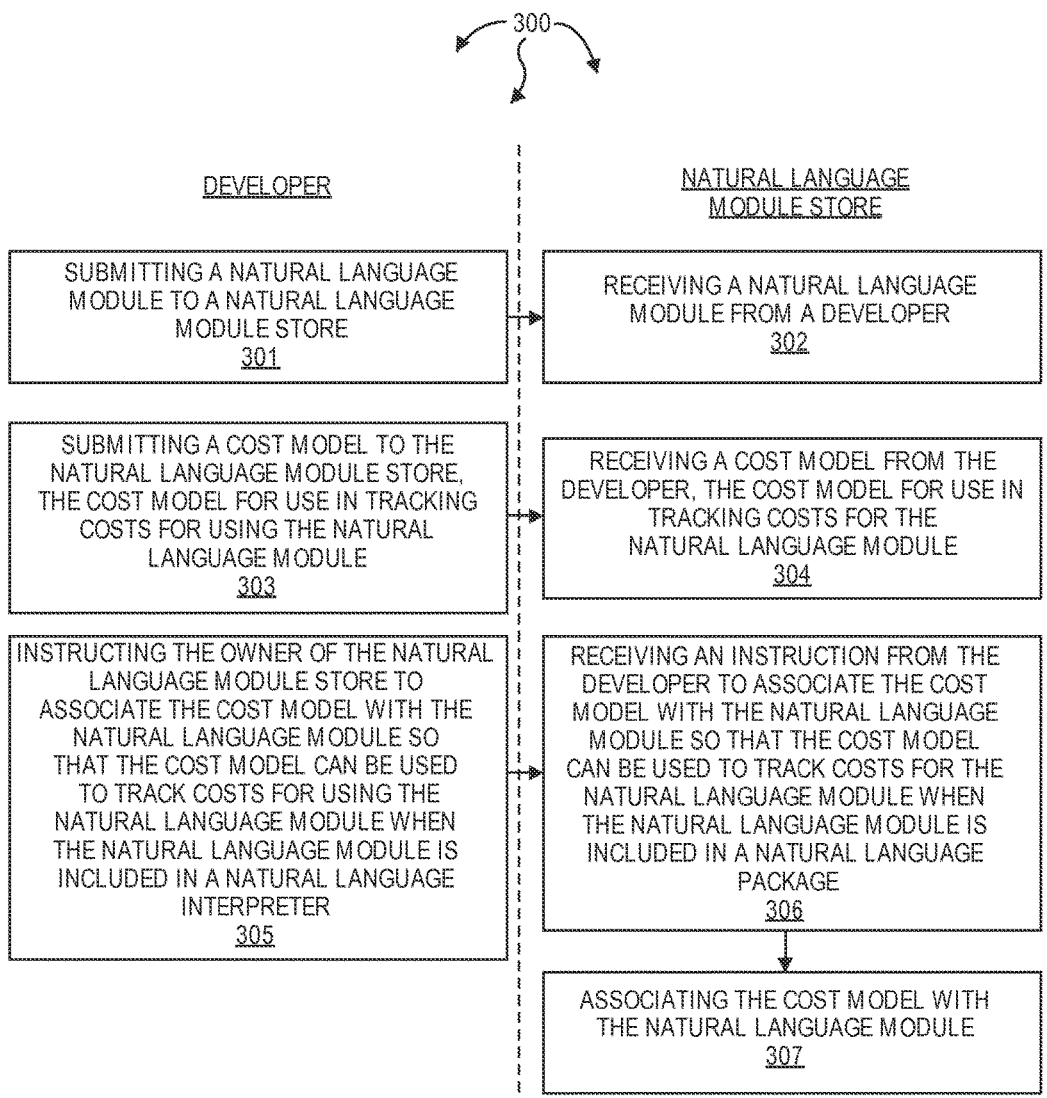
FIG. 3 illustrates a flow chart of an example method for making natural language recognition functionality available for inclusion in a natural language interpreter.

In general, a developer can send a natural language module and corresponding pricing model to natural language module store 202. Natural language module store 202 can receive the natural language module and corresponding pricing model. The pricing model is for tracking charges for using the natural language module. The developer can instruct natural language module store 202 to associate the pricing model with the natural language module. Natural language module store 202 can associate the pricing model with the natural language module FIG. 3 illustrates a flow chart of an example method 300 for making natural language recognition functionality available for inclusion in a natural language interpreter. Method 300 will be described with respect to the components and data of computer architecture 200.

Method 300 includes submitting a natural language module to a natural language module store (301). For example, developer 201 can submit natural language module 211 to natural language module store 202. Method 300 includes receiving a natural language module from a developer (302). For example, natural language module store 202 can receive natural language module 211 from developer 201.

Method 300 includes submitting a pricing model to the natural language module store, the pricing model for use in tracking charges for using the natural language module (303). For example, developer 201 can submit pricing model 212 to natural language module store 202. Pricing model 212 can be used to track charges for using natural language module 211. Method 300 includes receiving a corresponding pricing model from the developer, the corresponding pricing model for use in tracking charges for the natural language module (304). For example, natural language module store 202 can receive pricing model 212 from developer 201.

Method 200 includes instructing the owner of the natural language module store to associate the pricing model with the natural language module so that the pricing model can be used to track charges for using the natural language module when the natural language module is included in a natural language interpreter (205). For example, developer 201 can instruct natural language module store 202 to associate pricing model 212 with natural language module 211.

Method 200 includes receiving an instruction from the developer to associate the corresponding pricing model with the natural language module so that the pricing model can be used to track charges for the natural language module when the natural language module is included in a natural language interpreter (206). For example, natural language module store 202 can receive instruction 213 from developer 201. Method 200 includes associating the pricing model with the natural language module. For example, natural language module store 202 can establish association 214 to associate pricing module 212 with natural language module 211. Accordingly, natural language module store 202 can use pricing model 212 to track charges for natural language module 211 when natural language module 212 is included in a natural language interpreter (e.g., a natural language package or application).

In one aspect, natural language module 211 is a private NLM. Thus, developer 201 can also instruct natural language module store 202 to limit access to others that can provide proper access credentials, such as, for example, an account name and password, an access code, etc. Developer 201 can establish access credentials through other mechanisms. As appropriate, developer 201 can communicate access credentials to other users of natural language module store 202.

Figure 4:
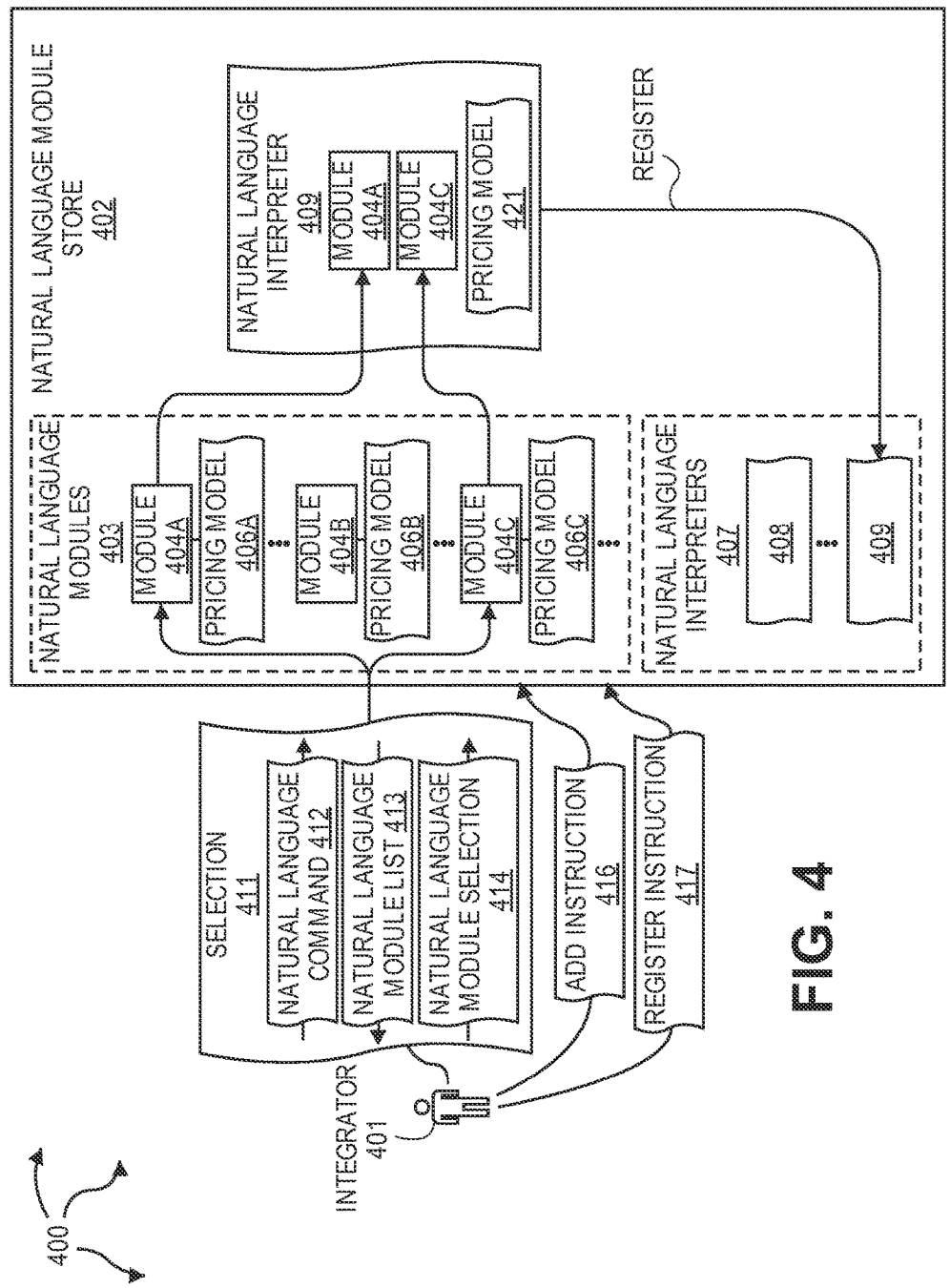
FIG. 4 illustrates an example computer architecture that facilitates assembling natural language recognition functionality in a language interpreter.

FIG. 4 illustrates an example computer architecture 400 that facilitates assembling natural language recognition functionality in a language interpreter. Referring to FIG. 4, computer architecture 400 includes natural language module store 402. Natural language module store 402 as well as its respective components can be connected to one another over (or be part of) a network, such as, for example, a PAN, a LAN, a WAN, and even the Internet. Accordingly, natural language module store 402 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

As depicted, natural language module store 402 includes natural language modules 403, including natural language modules 404A, 404B, 404C, etc. (one or more of which may be a private NLM). Each of natural language modules 403 can be selected for inclusion in a natural language interpreter (e.g., a natural language package or application). For a private NLM, access credentials can also be entered and evaluated. Each natural language module 403 is also associated with a corresponding pricing model. For example, natural language module 404A is associated with pricing model 406A, natural language module 404B is associated with pricing model 406B, natural language module 404C is associated with pricing model 406C, etc. A pricing model associated with a natural language module can be used to track charges for the natural language module. For example, pricing model 406A can be used to track charges for natural language module 404A, pricing model 406B can be used to track charges for natural language module 404B, etc.

Natural language interpreters 407 include natural language interpreters, such as, natural language interpreter 408 that are offered for use by natural language interpreter 409.

Integrators can select natural language modules available at natural language module 402 for inclusion natural language interpreters (e.g., natural language packages and applications).

Figure 5:
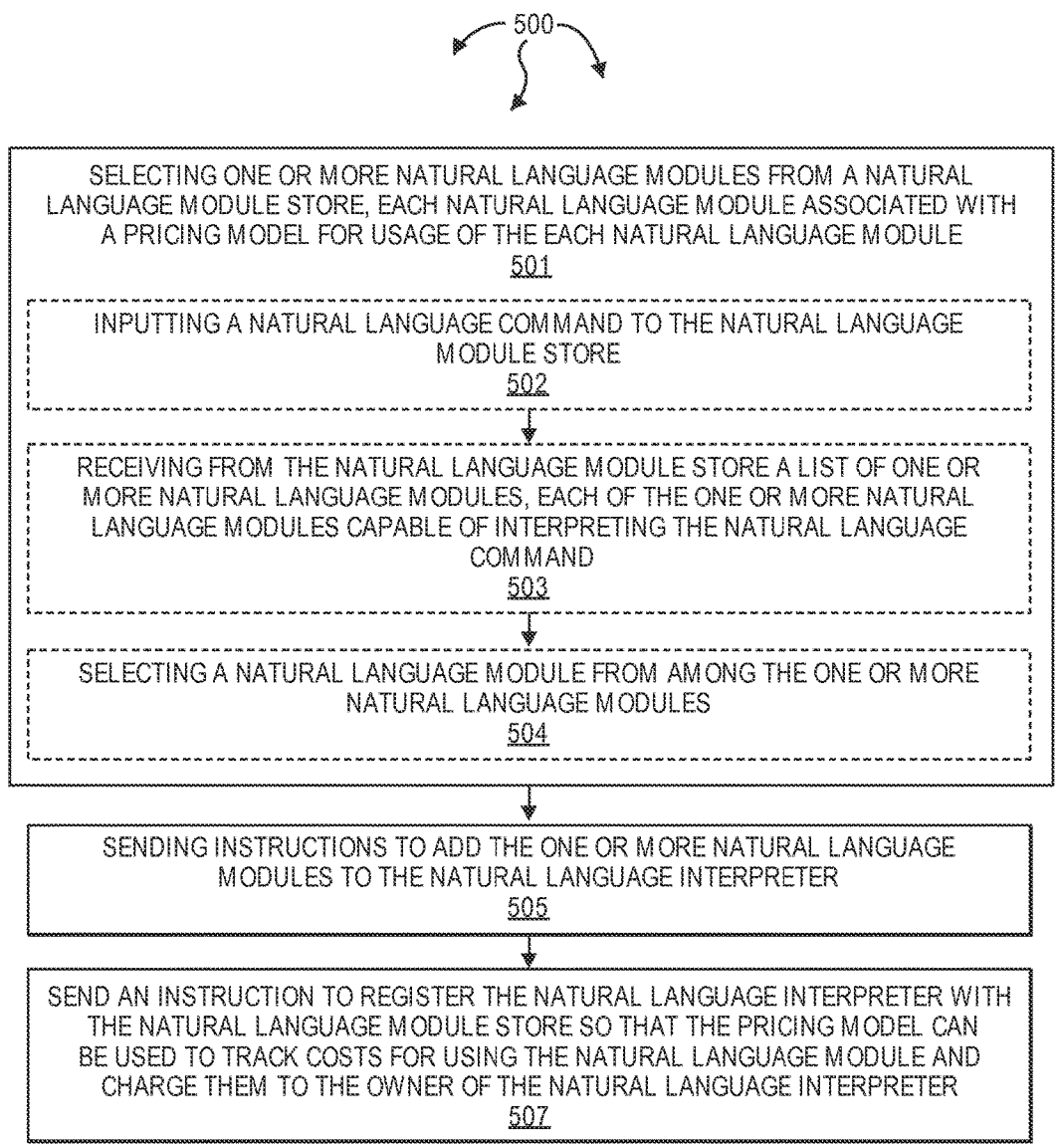
FIG. 5 illustrates a flow chart of an example method for assembling natural language recognition functionality in a language interpreter.

FIG. 5 illustrates a flow chart of an example method 500 for assembling natural language recognition functionality in a language interpreter. Method 500 will be described with respect to the components and data of computer architecture 400.

Method 500 includes selecting one or more natural language modules from a natural language module store, each natural language module associated with a pricing model for determining charges associated with usage of the natural language module by the natural language interpreter (501). For example, integrator 401 can send selection 411 to natural language module store 402. Selection 411 can select modules 404A and 404C from natural language modules 403.

Selecting one or more natural language modules can include inputting a natural language query to the natural language module store (502). For example, integrator 401 can input natural language query 412 to natural language module store 402. Selecting one or more natural language modules can include receiving from the natural language module store a list of one or more natural language modules, each of the one or more natural language modules capable of interpreting at least a part of the natural language query (503). For example, integrator 401 can receive natural language module list 413 from natural language module store 402. Natural language module list 413 can include natural language modules 404A and 404B (one or more of which may be a private NLM). Each of natural language modules 404A and 404B can be capable of interpreting at least part of natural language query 412. Selecting one or more natural language modules can include selecting a natural language module from among the one or more natural language modules (504). For example, integrator 401 can input natural language module selection 414 to natural language module store 402. Natural language module selection 414 can select natural language module 404A from among natural language modules 404A and 404B.

When one or more of natural language modules 404A and 404B is a private natural language module, selecting the natural language module 404A and/or 404B can include entering access credentials.

Method 500 includes sending instructions to add the one or more natural language modules to the natural language interpreter (505). For example, integrator 401 can send add instruction 416 to natural language module store 402. Add instruction 416 can instruct natural language model store 402 to add natural language modules 404A and 404C to natural language interpreter 409 (e.g., a natural language package or application).

Integrator 401 can also send pricing model 412 to natural language module store 402. Integrator 401 can instruct natural language module store 402 to associate pricing module 412 with natural language interpreter 409. Natural language module store 402 can associate pricing model 421 with natural language interpreter 409. Accordingly, natural language module store 402 can use pricing model 412 to track charges for natural language interpreter 409 when natural language interpreter 409 is used by another software component (e.g., a natural language package or application).

Method 500 includes sending an instruction to register the natural language interpreter with an owner of the natural language module store so that charges associated with the one or more natural language modules can be assessed for the owner of the natural language interpreter (507). For example, integrator 401 can send register instruction 417. Register instruction 417 is an instruction to register natural language interpreter 409 with natural language module store 402. Natural language module store 402 can register natural language interpreter 409 by including natural language interpreter 409 in natural language interpreters 407. Accordingly, charges associated with modules 404A and 4040C can be assessed to integrator 401. Additionally, charges for use of natural language interpreter 409 can be assessed against other integrators.

Figure 6:
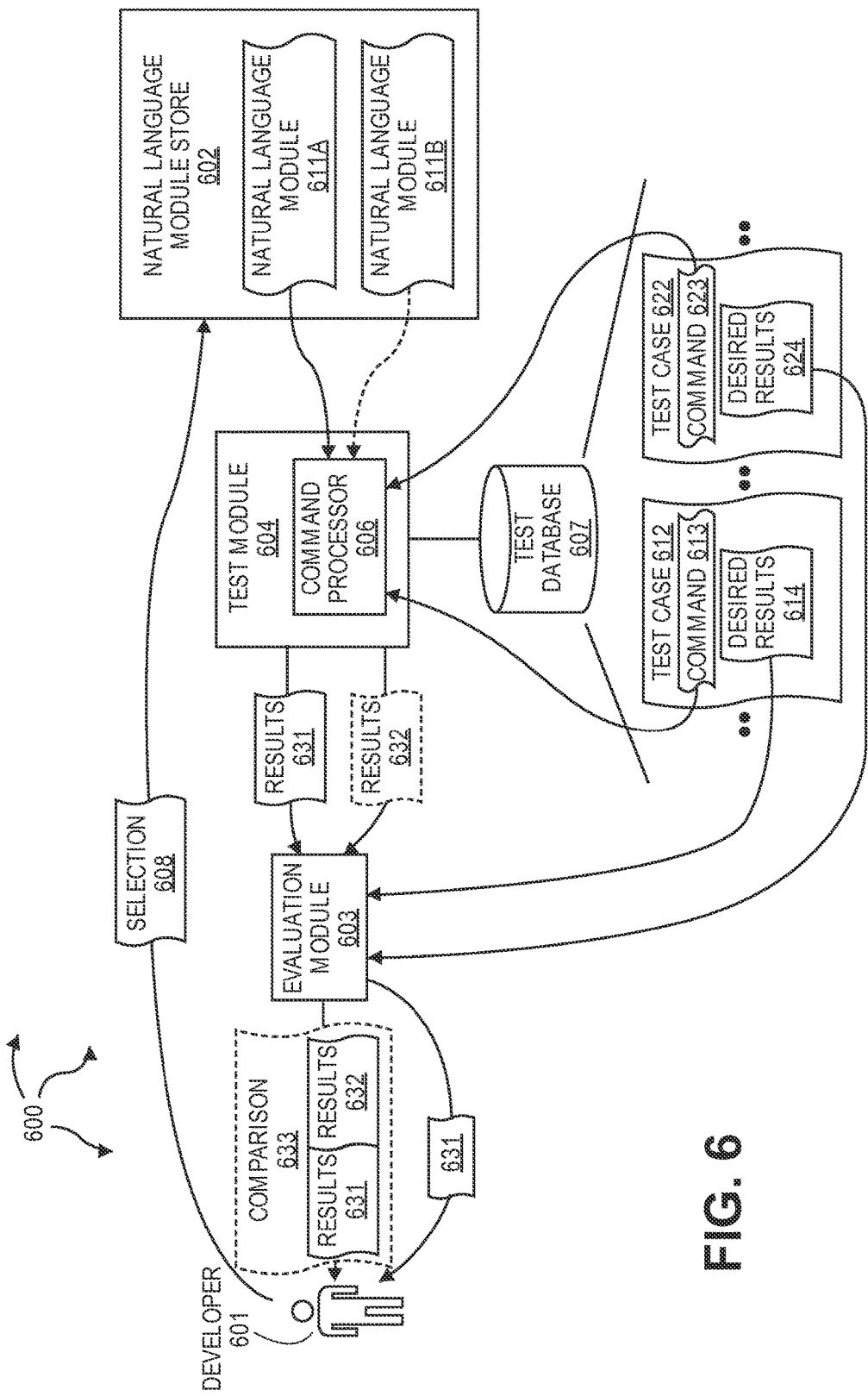
FIG. 6 illustrates an example computer architecture that facilitates assessing natural language recognition functionality for one or more natural language recognition modules.

FIG. 6 illustrates an example computer architecture 600 that facilitates assessing natural language recognition functionality for one or more natural language recognition modules. Referring to FIG. 6, computer architecture 600 includes natural language module store 602, evaluation module 603, and test module 604. Natural language module store 602, evaluation module 603, and test module 604 as well as their respective components can be connected to one another over (or be part of) a network, such as, for example, a PAN, a LAN, a WAN, and even the Internet. Accordingly, natural language module store 602, evaluation module 603, and test module 604 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

As depicted, natural language module store 402 includes natural language modules 611A, 611B, etc. (one or more of which may be a private NLM). Each of natural language modules 611A, 611B, etc., can be selected for inclusion in a natural language interpreter (e.g., a natural language package or application). For a private NLM, access credentials can also be entered and evaluated. Each natural language modules 611A, 611B, etc. can also be associated with a corresponding pricing model used to track charges for the natural language module.

In general, test module 604 can be used to test the ability of selected natural language modules to interpret natural language queries. Test module 604 can receive one or more selected natural language modules and one or more corresponding test cases. Query processor 606 can run the one or more test cases against the one or more selected natural language modules. To run a test case, query processor 606 provides a natural language query included in the test case to a selected natural language module for interpretation. The natural language query in the test case is similar to a natural language query the selected natural language module may have to interpret if deployed in a natural language interpreter (e.g., a natural language interpreter or application). The natural language module interprets the natural language query to generate results. Generated results can be sent to evaluation module 603.

Test database 607 stores test cases. Each test case includes a natural language query and corresponding desired results. Natural language queries from stored test cases can be provided to test module 604 to test selected natural language modules. Desired results from stored test cases can be provided to evaluation module 603.

Evaluation module 603 can receive generated results from test module 604. The generated test results are from a selected natural language module interpreting a natural language query. Evaluation module 603 can also receive desired results from test database 607. The desired results are results that are to be generated when a natural language module interprets the natural language query essentially accurately. Evaluation module 603 compares generated results to desired results to determine how accurately a natural language module interpreted a natural language query.

In one aspect, evaluation module 603 evaluates the accuracy of a natural language module for interpreting one or more natural language queries. In another aspect, evaluation module 603 compares the accuracy of a plurality of natural language modules relative to one another (e.g., in a side-by-side comparison) for interpreting one or more natural language queries. Evaluation module 603 can indicate the accuracy one or more natural language queries to an integrator.

Figure 7:
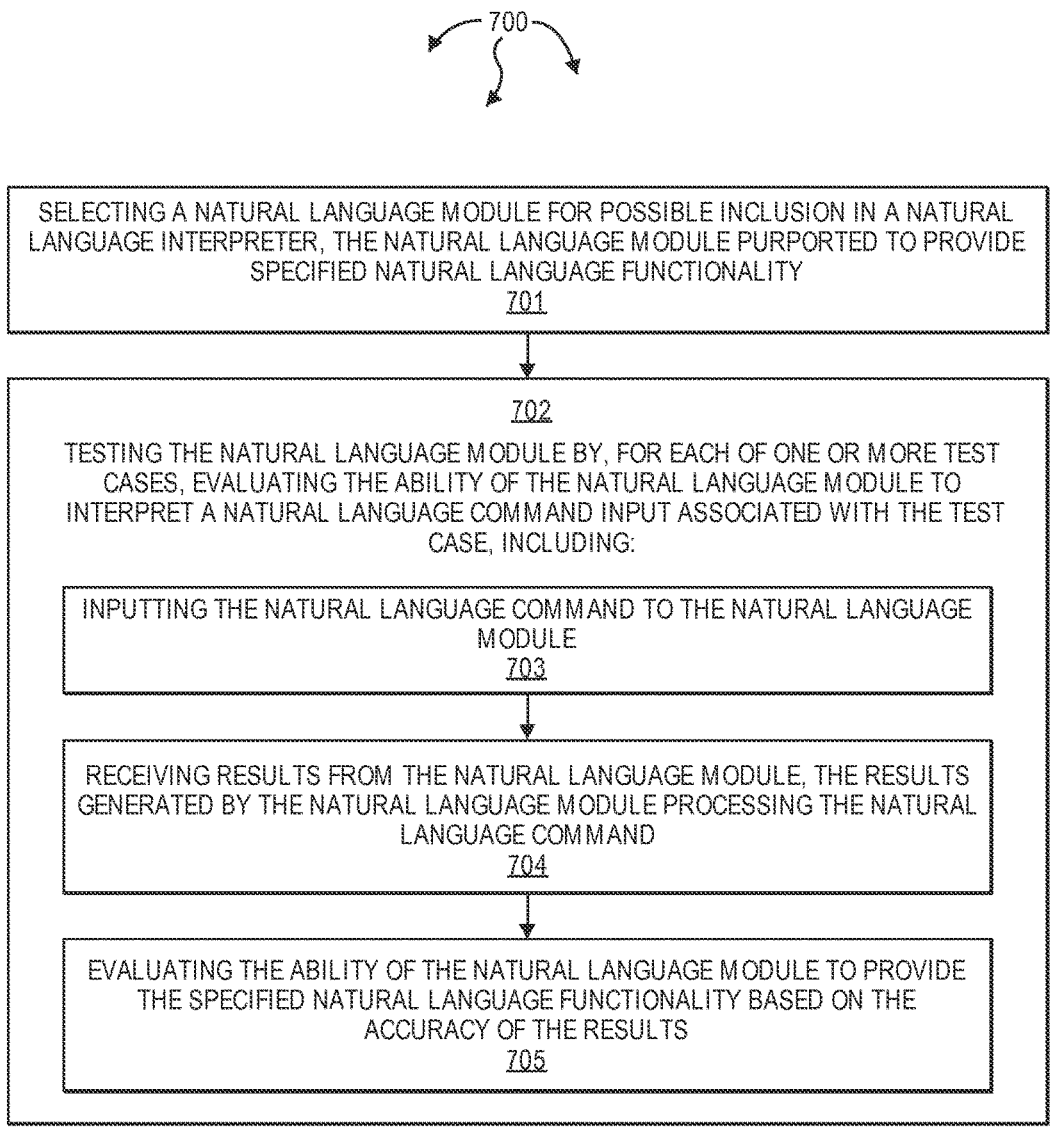
FIG. 7 illustrates a flow chart of an example method for assessing natural language recognition functionality a natural language recognition module.

FIG. 7 illustrates a flow chart of an example method for assessing natural language recognition functionality for a natural language recognition module. Method 700 will be described with respect to the components and data of computer architecture 600.

Method 700 includes selecting a natural language module for possible inclusion in a natural language interpreter, the natural language module purported to provide specified natural language functionality (701). For example, developer 601 can send selection 608 to natural language module store 602. Natural language module store 602 can receive selection 608. Selection 608 can select natural language module 611A (which may be a private NLM) for possible inclusion in a natural language interpreter (e.g., a natural language package or application). Natural language module 611A can purport to provide specified natural language functionality that is appropriate for the natural language interpreter. However, developer 601 may desire to test the purported natural language functionality prior to including natural language module 611A in the natural language interpreter.

When natural language module 611A is a private natural language module, selecting natural language module 611A can include entering access credentials.

Method 700 includes testing the natural language module by, for each of one or more test cases, evaluating the ability of the natural language module to interpret a natural language query input associated with the test case (702). For example, test module 604 can test natural language module 611A using test cases 612 and 622 to generate results 631. Evaluation module 603 can evaluate the ability of natural language module 611A to interpret natural language queries 613 and 623 by evaluating results 631 against desired results 614 and 624. Evaluation of a NLM can include visual inspection of a linearized output of the NLM, such as, for example, JSON. Evaluation of a NLM can also include applying verification procedures to linearized output, such as, for example, JSON. Verification procedures can include extracting information from the linearized output, or comparing the whole or parts of the linearized output to expected values.

Testing the natural language module includes inputting a natural language query to the natural language module (703). For example, query processor 606 can input natural language query 613 to natural language module 611A. Similarly, query processor 606 can input natural language query 623 to natural language module 611A.

Testing the natural language module includes receiving results from the natural language module, the results generated by the natural language module processing the natural language query (704). For example, natural language module 611A can interpret natural language queries 613 and 623 to generate results 631. Test module 604 can send results 631 to evaluation module 603. Evaluation module 603 can receive results 631 from test module 604.

Testing the natural language module includes evaluating the ability of the natural language module to provide the purported specified natural language functionality based on accuracy of the results (705). For example, evaluation module 603 can evaluate the ability of natural language module 611A to provide purported natural language functionality based on the accuracy of results 631. Evaluation module 603 can compare results 631 to desired results 614 and 624 to determine how accurate results 631 are relative to results 614 and 624.

Figure 8:
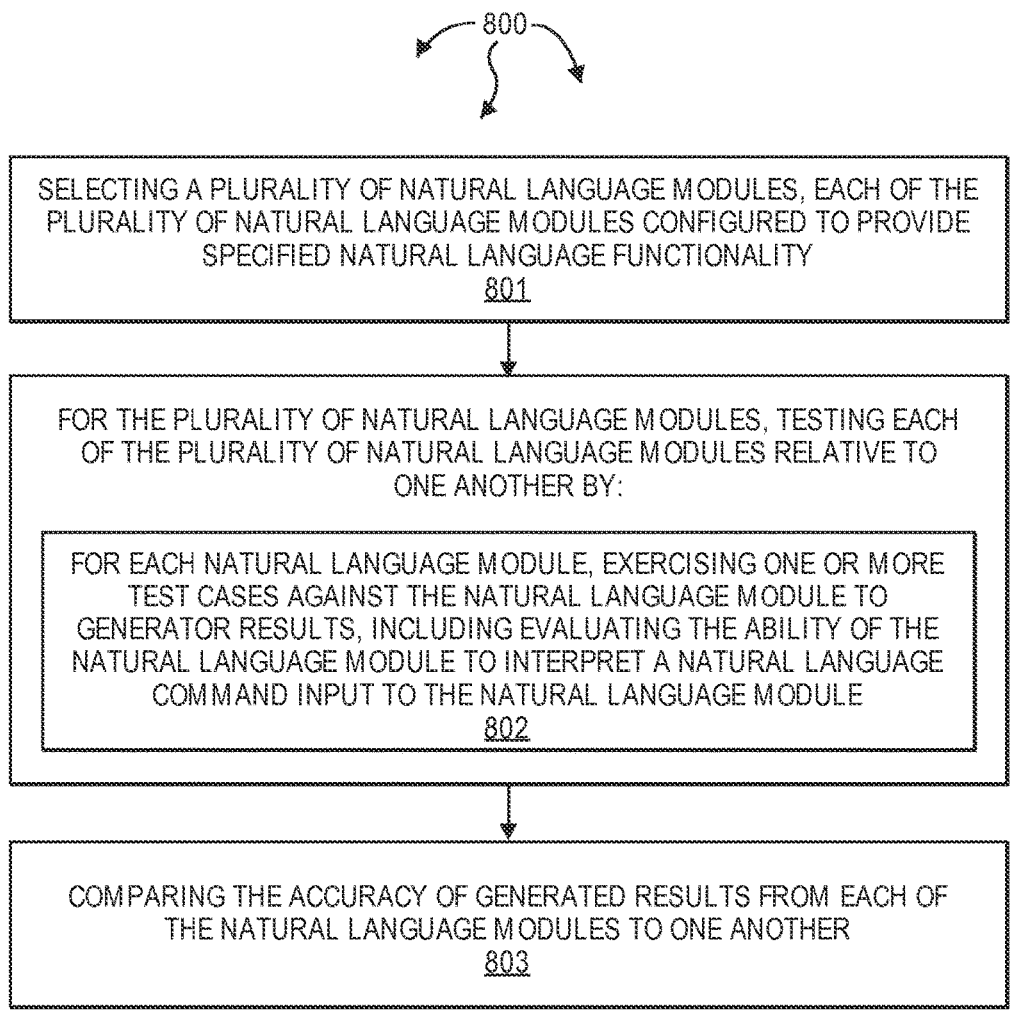
FIG. 8 illustrates a flow chart of an example method for assessing natural language recognition functionality for a plurality of natural language recognition modules.

FIG. 8 illustrates a flow chart of an example method 800 for assessing natural language recognition functionality for a plurality of natural language recognition modules. Method 800 will be described with respect to the components and data of computer architecture 600.

Method 800 includes selecting a plurality of natural language modules, each of the plurality of natural language modules configured to provide specified natural language functionality (801). For example, developer 601 can send selection 608 to natural language module store 602. Natural language module store 602 can receive selection 608. Selection 608 can select natural language modules 611A and 611B (one or more of which may be a private NLM) for possible inclusion in a natural language interpreter (e.g., a natural language package or application). Natural language modules 611A and 611B can each purport to provide the same specified natural language functionality. However, developer 601 may desire to test natural language modules 611A and 611B relative to one another prior to selecting one of natural language modules 611A and 611B for inclusion in a natural language interpreter (e.g., a natural language package or application).

When one or more of natural language modules 611A and 611B is a private natural language module, selecting the natural language module 611A and/or 611BB can include entering access credentials.

For the plurality of natural language modules, 802 includes testing each of the natural language modules relative to one another by exercising one or more test cases against the natural language module to generate results. This includes evaluating the ability of the natural language module to interpret a natural language query input to the natural language module. For example, natural language modules 611A and 611B can be tested relative to one another. Test module 604 can exercise test cases 612 and 622 against natural module 611A to generate results 631. To exercise test cases 612 and 622 against natural module 611A, query processor 606 can have natural module 611A interpret natural language queries 613 and 623 respectively. Similarly, test module 604 can exercise test cases 612 and 622 against natural module 611B to generate results 632. To exercise test cases 612 and 622 against natural module 611B, query processor 606 can have natural language module 611B interpret natural language queries 613 and 623 respectively.

Test module 604 can send results 631 and 632 to evaluation module 603. Evaluation module 603 can evaluate the ability of natural language module 611A to provide purported natural language functionality based on the accuracy of results 631. Evaluation module 603 can compare results 631 to desired results 614 and 624 to determine how accurate results 631 are relative to results 614 and 624. Similarly, evaluation module 603 can evaluate the ability of natural language module 611B to provide purported natural language functionality based on the accuracy of results 632. Evaluation module 603 can compare results 632 to desired results 614 and 624 to determine how accurate results 632 are relative to results 614 and 624.

Method 800 includes comparing the accuracy of generated results from each of the natural language modules to one another (803). For example, evaluation module 603 can compare the accuracy of results 631 to the accuracy of results 632. In one aspect, evaluation module 603 generates comparison 633 (e.g., a side-by-side comparison). Evaluation module 603 sends comparison 633 to developer 601. Comparison 633 can indicate whether natural language module 611A or natural language module 611B interpreted queries 613 and 623 more accurately. Based on comparison 633, developer 601 can make a more informed decision when selecting natural language modules for inclusion in a natural language interpreter (e.g., a natural language package or application).

Figure 9:
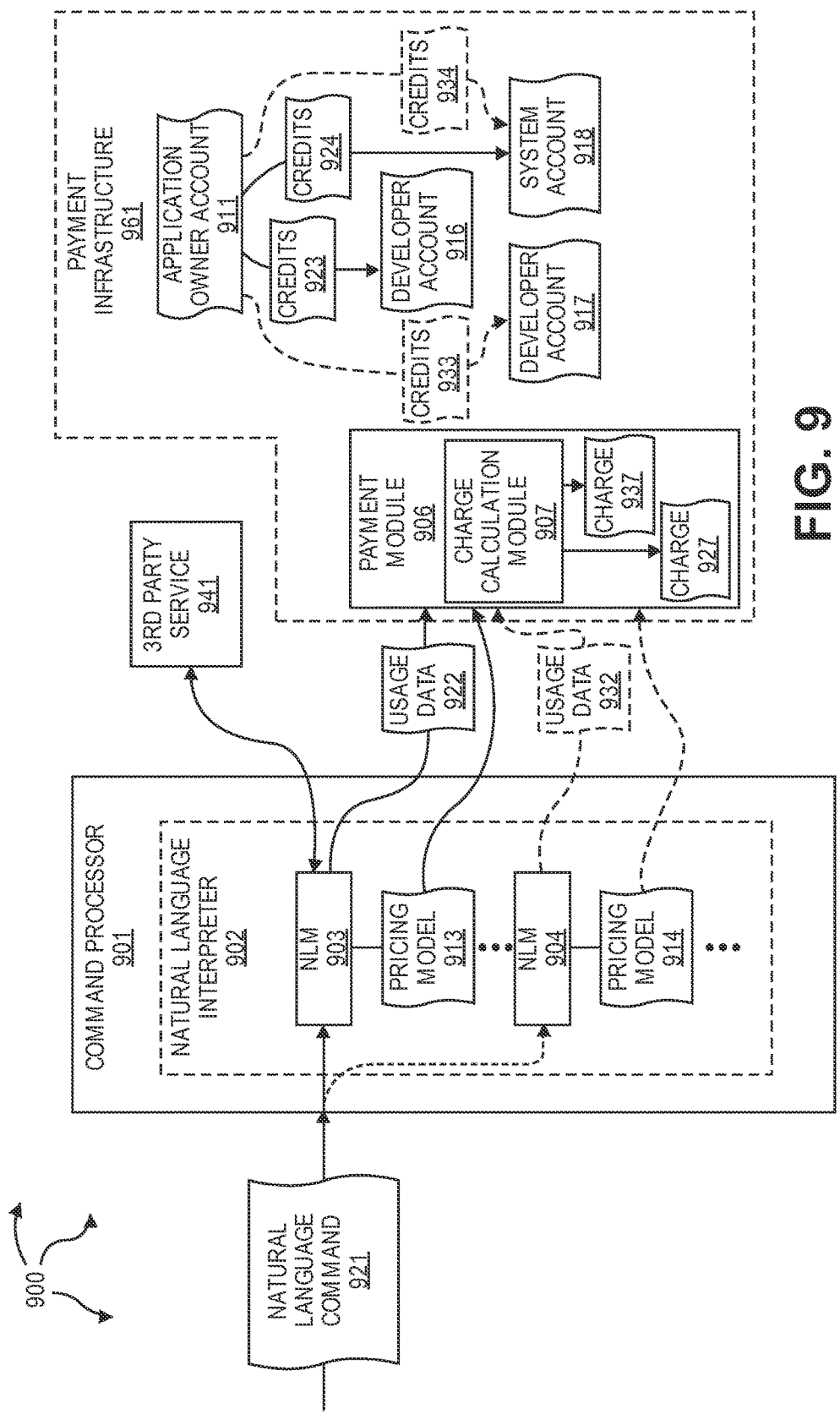
FIG. 9 illustrates an example computer architecture that facilitates processing a natural language query.

FIG. 9 illustrates an example computer architecture 900 that facilitates processing a natural language query. Referring to FIG. 9, computer architecture 600 includes natural query processor 901 and payment infrastructure 961. Query processor 901 and payment infrastructure 961 as well as their respective components can be connected to one another over (or be part of) a network, such as, for example, a PAN, a LAN, a WAN, and even the Internet. Accordingly, query processor 901 and payment infrastructure 961, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

In general, query processor 901 executes natural language modules capable of interpreting natural language queries. Query processor 901 can use natural language modules to interpret natural language queries. Each natural language module can be associated with a corresponding pricing model. When interpreting a natural language query, query processor 901 can also calculate usage data for the use of natural language modules and $3^{rd}$ party services. Query processor can send the usage data and a pricing model for a natural language processing module to payment module 906.

Payment module 906 can receive usage data and pricing models from query processor 901. From usage data and pricing models, charge calculation module 907 can calculate a charge for interpreting a natural language query. Payment infrastructure 961 can settle charges between different account holders having accounts within payment infrastructure 961. For example, when an natural language interpreter is used, credits (or any other arbitrary units of virtual currency) can be transferred from an owner of the natural language interpreter to any accounts from among: one or more NLM developers, one or more natural language interpreter integrators (e.g., when a natural language package is included in an application), one or more owners of $3^{rd}$ party services, and an owner of a natural language module store.

Payment infrastructure 961 can also include an exchange module (not shown) for exchanging other forms of currency for credits and exchanging credits for other forms of currency. An exchange module can be based on the credit's relation to a known real currency, such as, for example, 1000 credits=$1. The relation between a credit and a known currency can be adjusted according to circumstances, modifying the credit's "market rate." Thus, application owners or other interested parties can purchase credits as needed using the known real currency.

Figure 10:
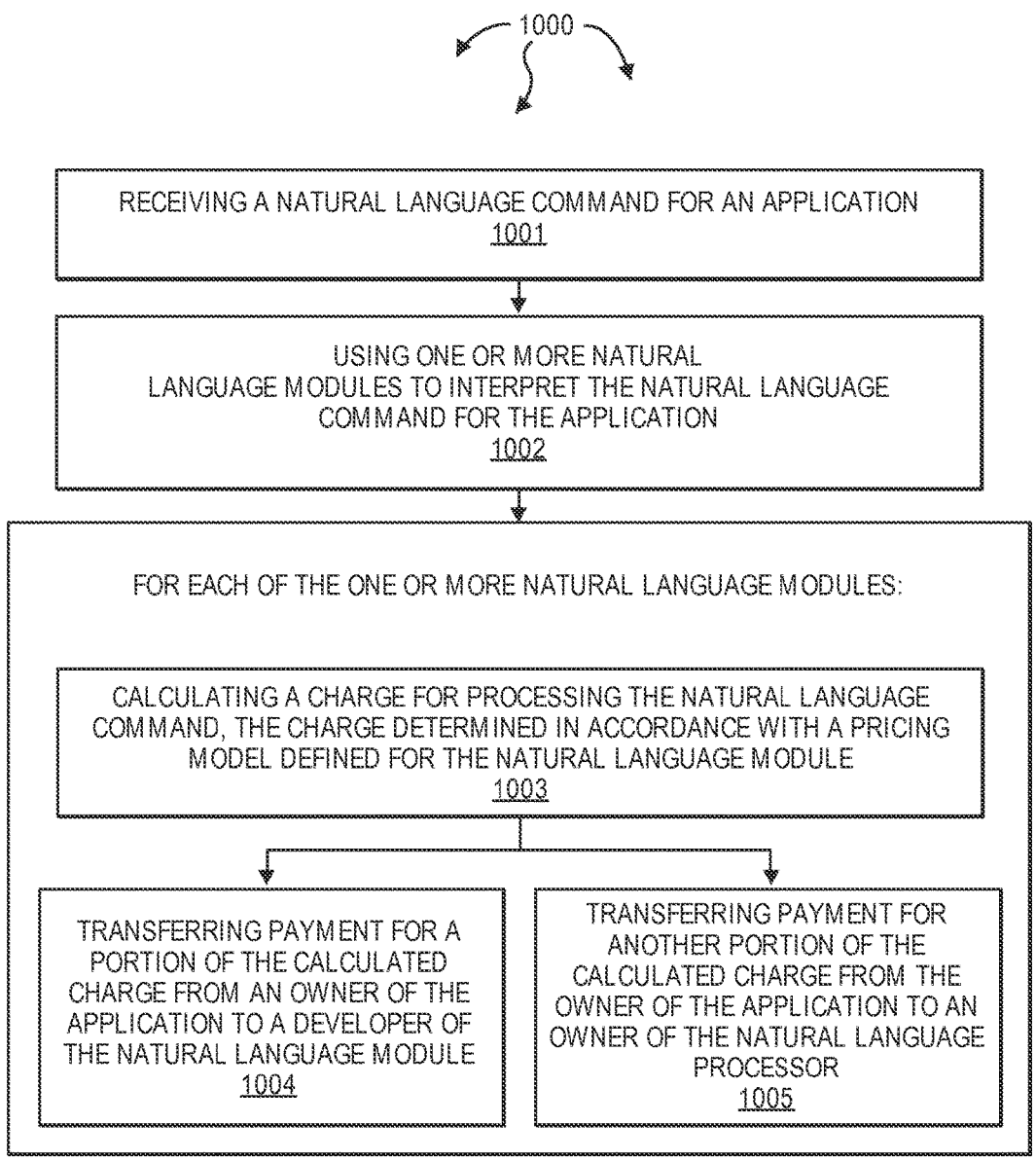
FIG. 10 illustrates a flow chart of an example method for processing a natural language query.

FIG. 10 illustrates a flow chart of an example method 1000 for processing a natural language query. Method 1000 will be described with respect to the components and data of computer architecture 900.

Method 1000 includes receiving the natural language query for the application (1001). For example, query processor 901 can receive natural language query 921. Query processor 901 can determine that natural language query 921 is directed to natural language interpreter 902. Method 1000 includes using one or more natural language modules to interpret the natural language query for the application (1002). For example, query processor 901 can use NLM 903 and NLM 904 to interpret natural language query 921. NLM 903 can further utilize $3^{rd}$ party service 941.

For each of the one or more natural language modules, method 1000 includes calculating a charge for processing the natural language query, the charge determined in accordance with a pricing model defined for the natural language module (1003). For example, query processor 901 can send usage data 922 and pricing model 913 to payment module 906. Charge calculation module 907 can calculate charge 927 (for NLM 903) based on usage data 922 and pricing model 913. Similarly, query processor 901 can send usage data 932 and pricing model 914 to payment module 906. Charge calculation module 907 can calculate charge 937 (for NLM 904) based on usage data 932 and pricing model 914.

For each of the one or more natural language modules, method 1000 includes transferring payment for a portion of the calculated charge from an owner of the application to a developer of the natural language module (1004). For example, to partially settle charge 927, payment infrastructure 961 can transfer credits 923 from application owner account 911 to developer account 916 (an account for the developer of NLM 903). Similarly, to partially settle charge 937, payment infrastructure 961 can transfer credits 933 from application owner account 911 to developer account 917 (an account for the developer of NLM 904).

For each of the one or more natural language modules, method 1000 includes transferring payment for a portion of the calculated charge from an owner of the application to an owner of the natural language processor (1005). For example, to partially settle charge 927, payment infrastructure 961 can transfer credits 924 from application owner account 911 to system account 918. Similarly, to partially settle charge 937, payment infrastructure 961 can transfer credits 934 from application owner account 911 to system account 918. System account 918 can be an account for an owner of query processor 901. In one aspect, the owner of query processor 901 is also an owner of a natural language module store where NLM 903 and NLM 904 are made available for inclusion in natural language interpreters.

Figure 11:
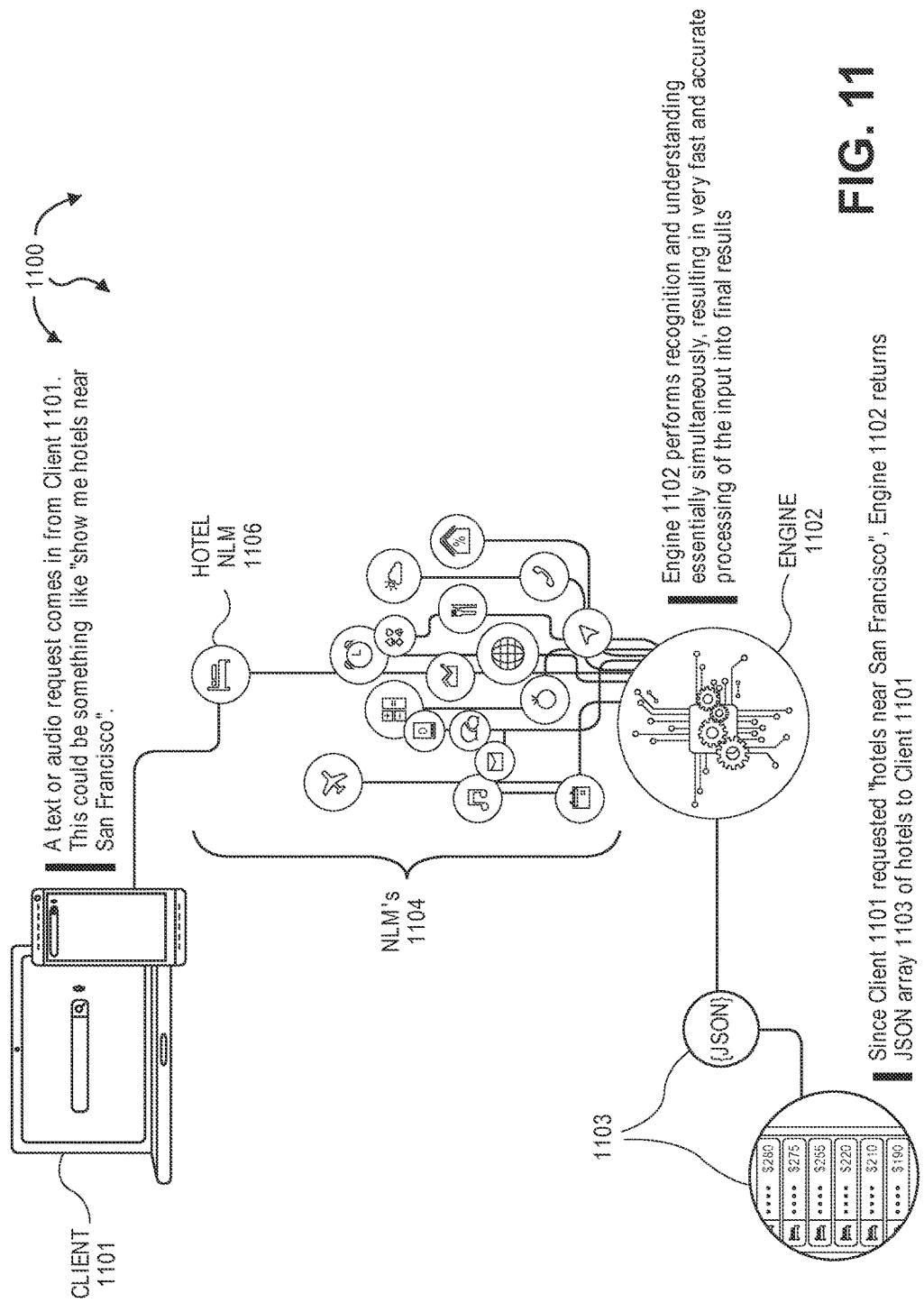
FIG. 11 illustrates an example data flow for processing a client natural language request.

FIG. 11 illustrates an example data flow 1100 for processing a natural language client request. As depicted, engine 1102 is configured to interoperate with any of a plurality of NLMs 1104, including hotel NLM 1106. Client 1101 can submit a text or speech request "show me hotels next San Francisco". Engine 1102 can use hotel NLM 1106 to process the natural language request. Engine 1102 can return a JSON array 1103 of hotels back to client 1101.

Figure 12B:
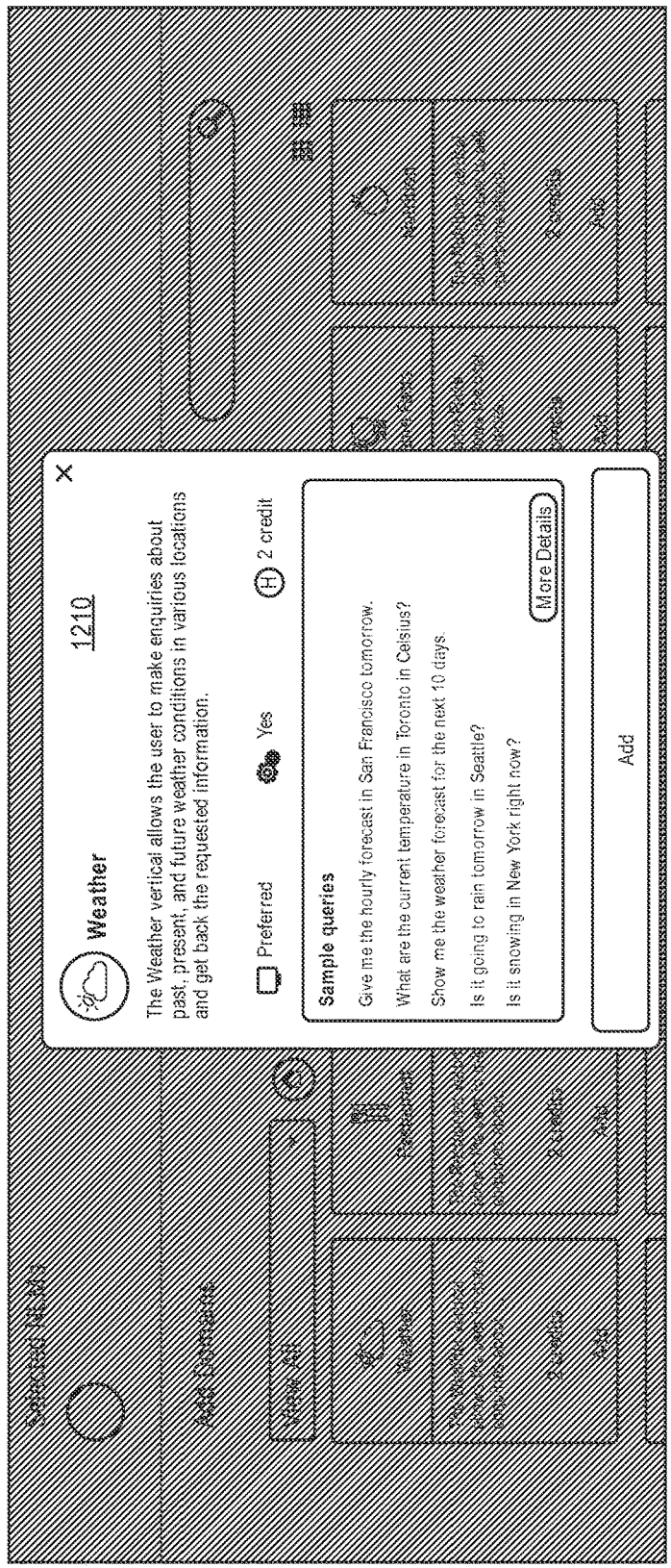

FIGS. 12A-12D illustrate various user interface screens associated with adding NLMs to an NLI. FIG. 12A illustrates a user interface screen 1200. User interface 1200 includes drop down 1201 for viewing NLMs by category. User interface also includes search 1202 for searching for NLMs. NLMs 1203 for various domains, including NLM 1206 for a weather domain and NLM 1222 for a nutrition domain, are selectable directly from user interface screen 1200 using an "add" button for inclusion in an NLI. Each NLM 1203 also indicates a cost for usage in credits. With proper access credentials, a private NLM for a domain from among private NLMs 1204 is also selectable directly from user interface screen 1200 for inclusion in an NLI.

A prospective user of a NLM may desire more information about a particular NLM. As such, the prospective user can select a user interface control to access more information about the particular NLM. For example, FIG. 12B illustrates a user interface screen 1210 providing more information about NLM 1206 for a weather domain.

Figure 12C:
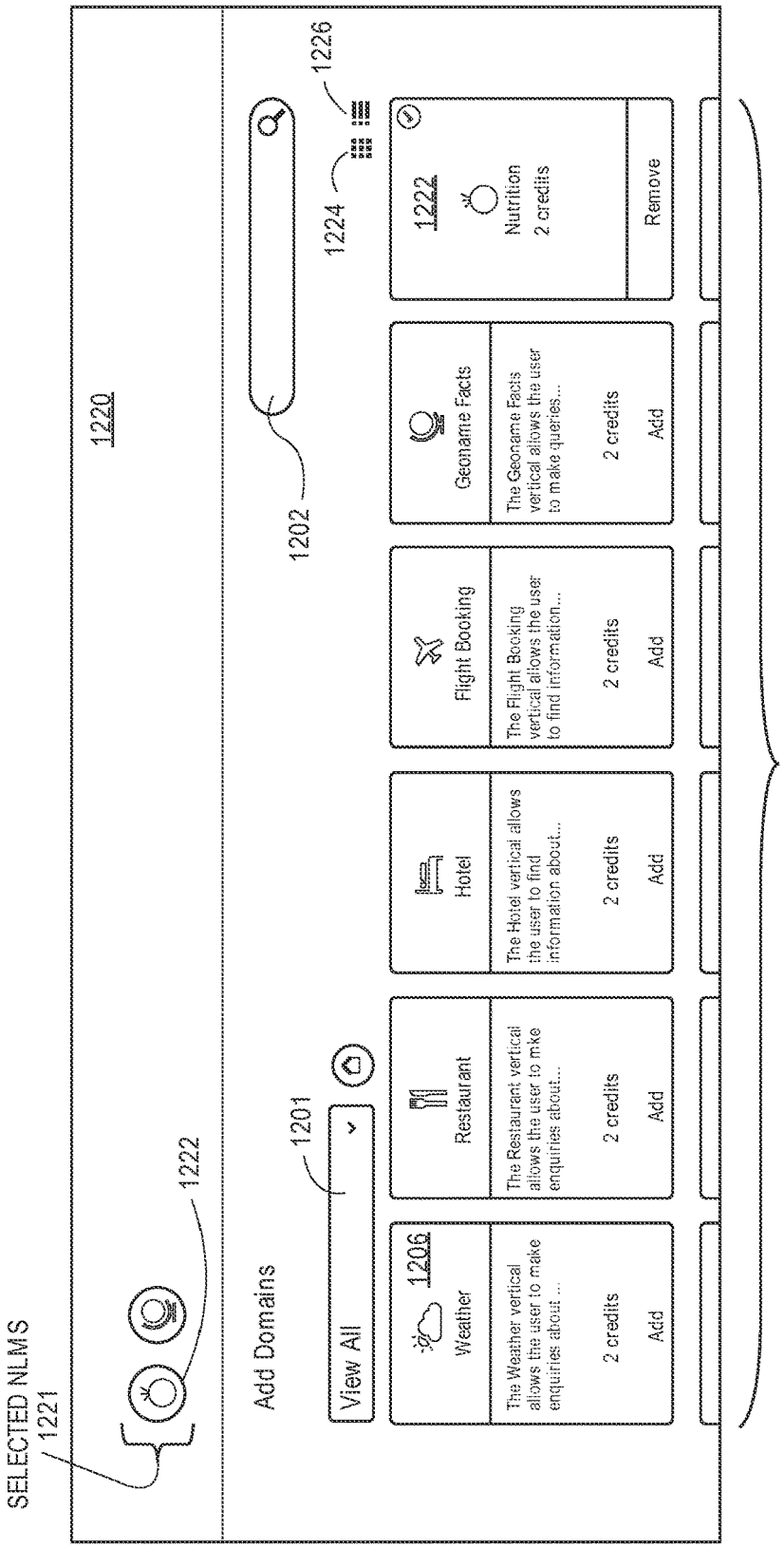

FIG. 12C illustrates a user interface screen 1220. A "view all" option is selected from drop down 1201 to present all available NLMs 1203 for selection. Selected NLMs 1221 including NLM 1222 for the nutrition domain are indicated. Selected NLMs can be deselected for inclusion in an NLI using a "remove" button. Controls 1224 and 1226 allow a user to toggle between a grid view and a list view of NLMs 1203. In user interface screen 1220 a grid view is selected.

FIG. 12D illustrates a user interface screen 1230 with NLMs 1203 presented in a list view. NLMs 1206 for the weather domain and 1232 for a flight booking domain are selected for inclusion in an NLI. Each NLM 1203 also indicates a cost for usage in credits. "Add" and "Remove" buttons are also depicted.

When appropriate, user interface screens 1200, 1210, 1220, and 1230 can also include user interface controls for accessing NLM testing functionality. A user can access the NLM testing functionality to test and compare NLMs prior to selection.

Figure 13A:
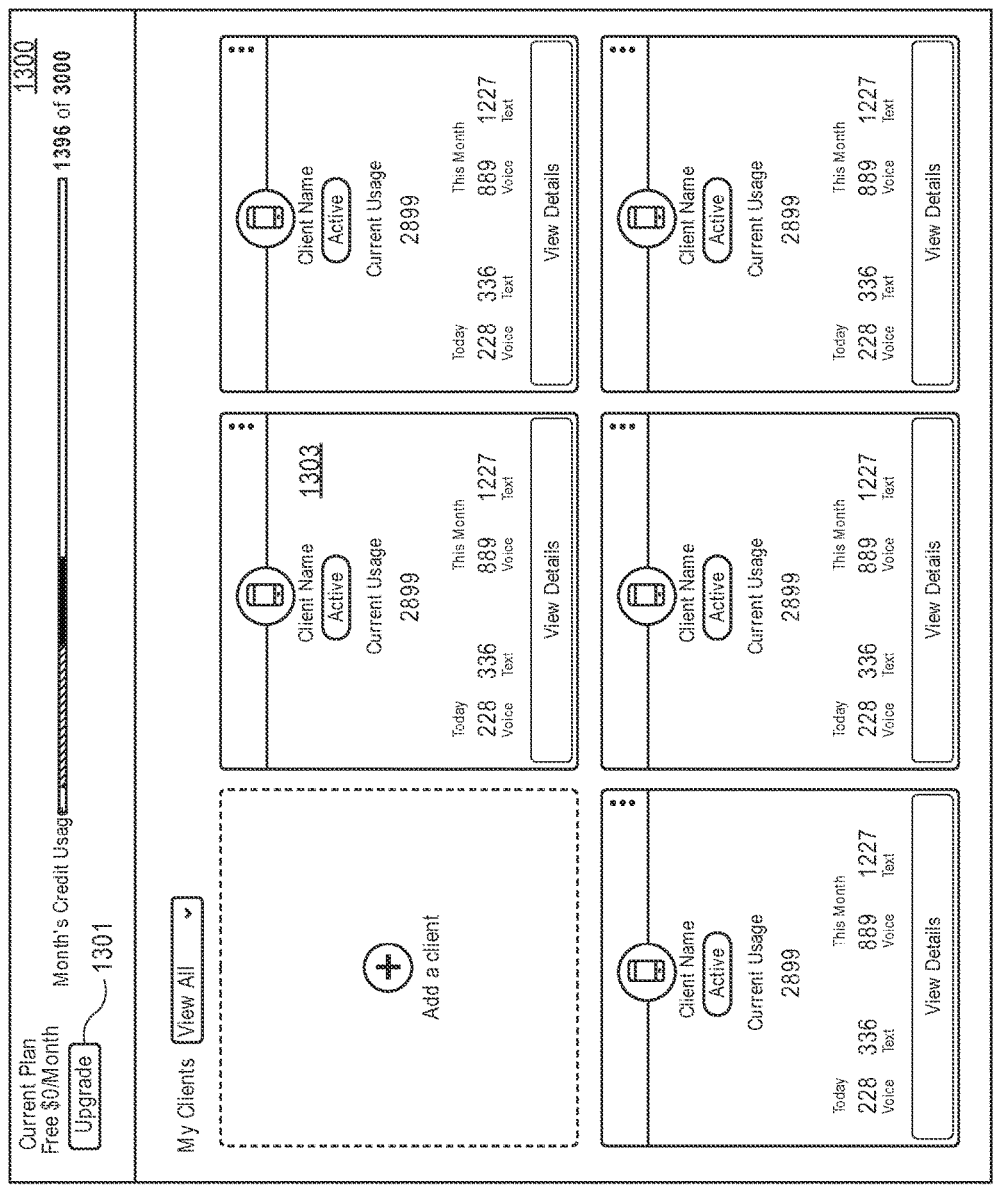
FIGS. 13A and 13B illustrate user interface screens associated with client usage.
Figure 13B:
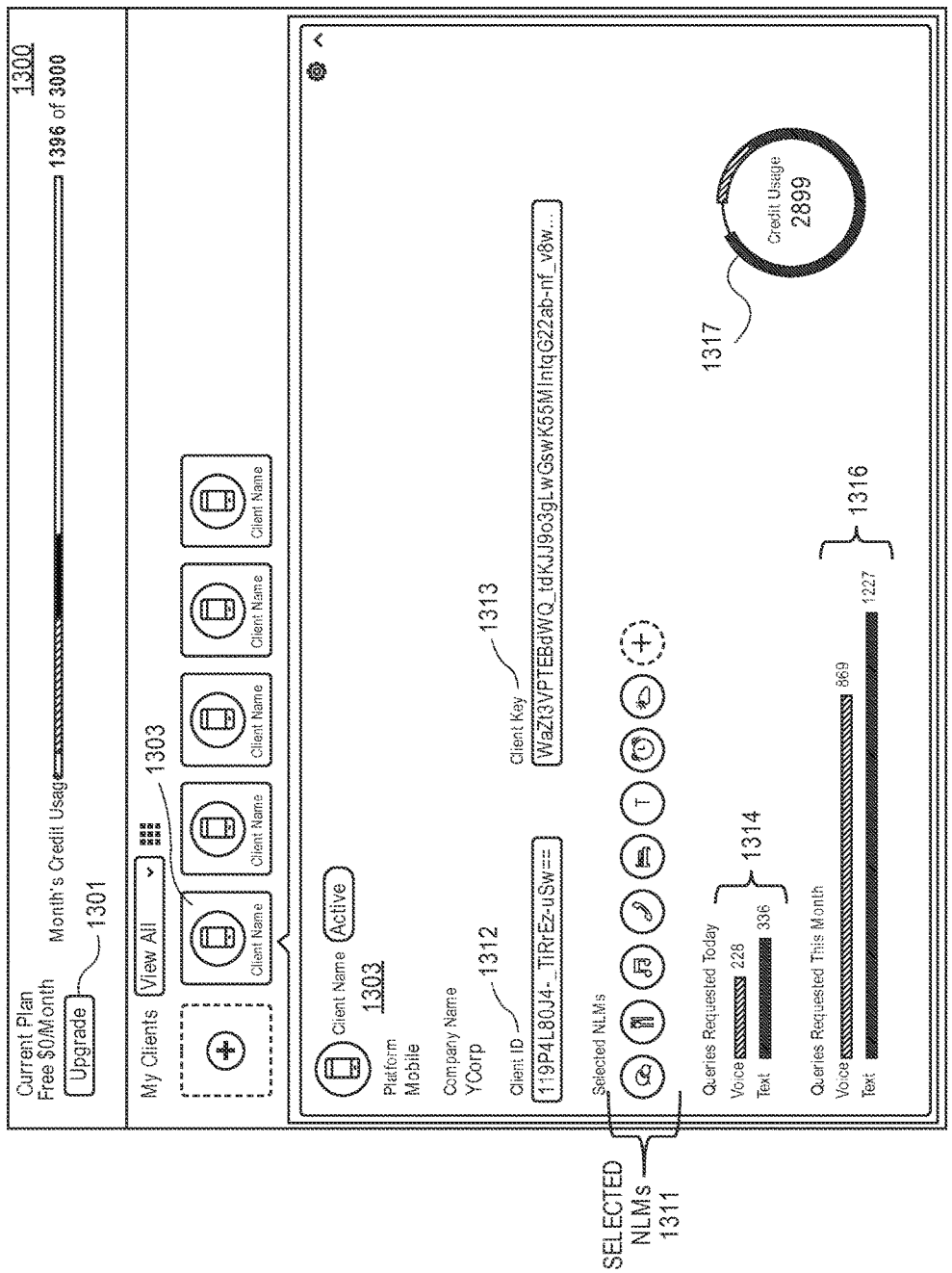

FIGS. 13A and 13B illustrate user interface screens associated with client usage. FIG. 13A illustrates a user interface screen 1300. User interface screen 1300 indicates usage for clients 1302, including client 1303. User interface screen 1300 also includes an upgrade button 1301 for upgrading a current plan to obtain additional credits per month. A client can be selected to display more information about the client.

For example, turning to FIG. 13B, user interface screen 1310 illustrates additional information about client 1303, including selected NLMs 1311. User interface screen 1310 also illustrates a client ID 1312 and client key 1313. User interface screen 1310 also indicates queries requested today 1314, queries requested this month 1316, and credit usage 2889.

Figure 14:
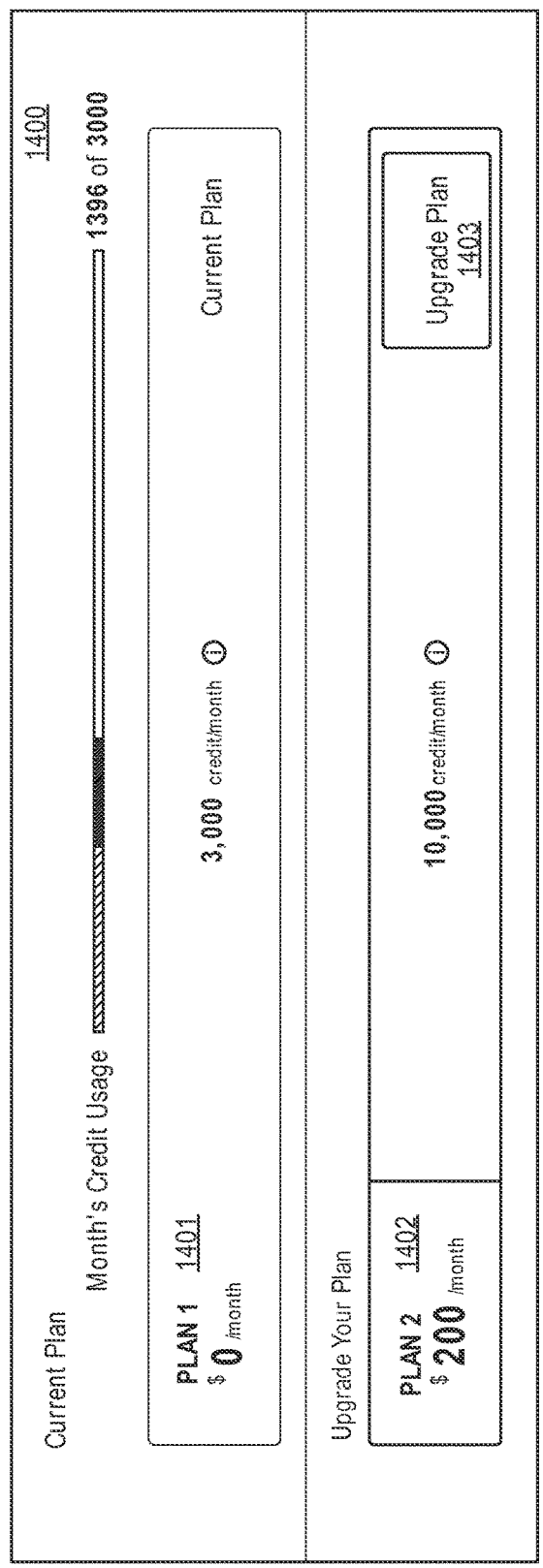
FIG. 14 illustrates a user interface for upgrading a plan.

Selection of upgrade button 1301 can transition a user to another user interface screen for upgrading the current plan. For example, FIG. 14 illustrates a user interface 1400 for upgrading a plan. Current plan 1401 provides a user with 3000 credits per month for $0 per month. Plan 1402 provides a user with 10000 credits per month for $200 per month. A user can selected upgrade plan button 1403 to attempt to upgrade to plan 1402. Selection of upgrade plan button 1043 can take the user to a payment interface. If payment is successful received through the payment interface, the user is upgraded to plan 1402.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method comprising:
presenting a plurality of natural language modules and corresponding defined pricing models at a store, each of the plurality of natural language modules associated with a domain selected by a developer from among a plurality of domains;
receiving a natural language query for an application;
using a natural language processor to interpret the natural language query, the natural language processor including the plurality of natural language modules;
for each of the plurality of natural language modules:
the natural language module producing a meaning representation encoding semantics of the natural language query; and
calculating a charge for processing the natural language query, the charge based on the domain and determined in accordance with the pricing model defined for the natural language module; and
providing a meaning representation and applying the calculated charges.

2. The method of claim 1, wherein the natural language query is a spoken command.

3. The method of claim 2, wherein calculating the charge for processing the natural language query comprises calculating part of the charge based on the duration of verbal input used to issue the spoken command.

4. The method of claim 1, wherein the natural language query comprises text input.

5. The method of claim 1, wherein calculating a charge for processing the natural language query comprises calculating a module usage charge for using the natural language module to interpret the natural language query.

6. The method of claim 1, wherein calculating a charge for processing the natural language query comprises:
determining an additional charge for use of a third party service, the third party service used to identify data or take action responsive to the natural language query; and
adding the additional charge to the charge for processing the natural language query.

7. The method of claim 6, wherein determining an additional charge for use of a third party service comprises determining an additional charge for use of a third party service provided through a third party programming interface.

8. The method of claim 1, wherein calculating a charge for processing the natural language query comprises calculating a per-query charge.

9. The method of claim 1, wherein the natural language query comprises speech.

10. A method for assessing natural language recognition functionality, the method comprising:
selecting a plurality of natural language modules from a natural language store as candidates for assembly into a natural language interpreter, each of the plurality of natural language modules having a defined pricing model and configured to provide a domain of natural language functionality offered by the natural language interpreter;
for a subset of the plurality of natural language modules corresponding to the domain, testing each of the subsets of natural language modules, including:
exercising a test case including evaluating the ability of the natural language module to interpret a natural language query input to the natural language module into a meaning representation in the domain; and
verifying the accuracy of the interpretation; and
providing a natural language module, from among the subset of natural language modules, for assembly into the natural language interpreter based on the verified accuracy of the interpretation.

11. The method of claim 10, further comprising comparing the accuracy of meaning representations for the plurality of natural language modules to one another in a side-by-side comparison.

12. The method of claim 11, further comprising selecting a natural language module, from among the plurality of natural language modules, for assembly into the natural language interpreter based on accuracy of meaning representations indicated in the side-by-side comparison.

13. The method of claim 11, wherein comparing the results meaning representations in a side-by-side comparison comprises testing the plurality of natural language modules using one or more pre-defined test use cases.

14. The method of claim 11, wherein comparing the meaning representations in a side-by-side comparison comprises testing the performance of each of the plurality of natural language modules against one or more test databases.

15. The method of claim 10, wherein selecting a plurality of natural language modules comprises entering access credentials for at least one private natural language module.

16. The method of claim 10, wherein the natural language query comprises text.

17. The method of claim 10, wherein the natural language query comprises speech.

18. A method for selecting a natural language module from a natural language module store comprising:
inputting a natural language query to the natural language module store, the natural language module store offering use of natural language modules in a domain for compensation in accordance with corresponding defined pricing models;
responsive to the natural language query, receiving from the natural language module store a list of natural language modules capable of interpreting at least a part of the natural language query to produce a meaning representation in the domain; and
selecting a natural language module, from among the plurality of natural language modules, for inclusion in a natural language interpreter to interpret natural language queries in the domain.

19. The method of claim 18, wherein selecting a natural language module from a natural language module store comprises:
browsing through the plurality of natural language modules presented by the natural language module store; and
selecting the natural language module from among the plurality of natural language modules.

20. The method of claim 18, wherein receiving from the natural language module store a list of a plurality of natural language modules comprises receiving a private natural language module; and
wherein selecting a natural language module from among the plurality of natural language modules comprises entering access credentials for the private natural language module.

21. A method for processing a natural language query, the method comprising:
presenting a plurality of natural language modules for a domain along with corresponding pricing models defined for each of the plurality of natural language modules at a natural language module store;
using each of the plurality of natural language modules to interpret the natural language query into a meaning representation in the domain;
choosing a natural language module, from among the plurality of natural language modules, based on the interpreting in the domain; and
calculating a charge for the chosen natural language module to process the natural language query, the charge determined in accordance with the corresponding pricing model defined for the chosen natural language module.

22. The method of claim 21, wherein calculating a charge for processing the natural language query comprises calculating a per-query charge.

23. The method of claim 21, wherein the natural language query comprises text.

24. The method of claim 21, wherein the natural language query comprises speech.

* * * * *